July 27, 1954

W. E. KOCK 2,684,725

COMPRESSIONAL WAVE GUIDE SYSTEM

Filed May 5, 1949

INVENTOR
W. E. KOCK
BY
Franklin Mohr
ATTORNEY

July 27, 1954

W. E. KOCK 2,684,725

COMPRESSIONAL WAVE GUIDE SYSTEM

Filed May 5, 1949

INVENTOR
W. E. KOCK
BY
Franklin Mohr
ATTORNEY

July 27, 1954
W. E. KOCK
2,684,725
COMPRESSIONAL WAVE GUIDE SYSTEM
Filed May 5, 1949
3 Sheets-Sheet 3
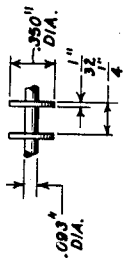
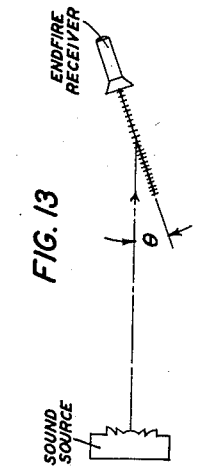
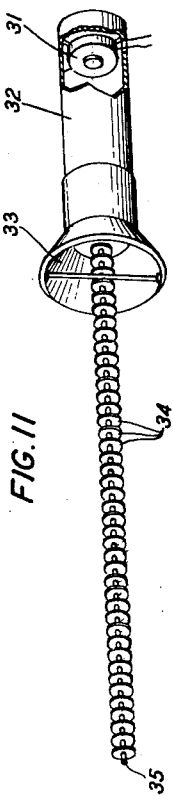
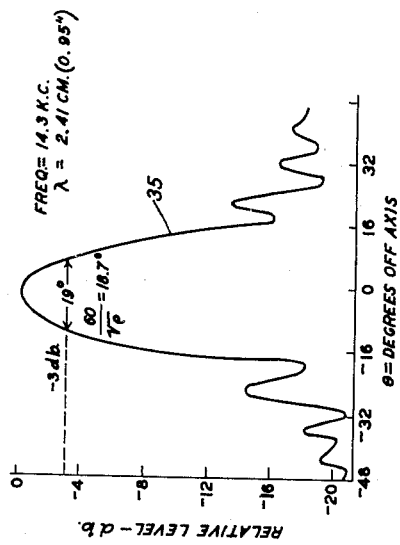
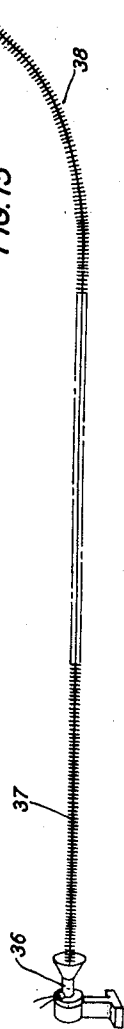
INVENTOR
W. E. KOCK
BY
Franklin Mohr
ATTORNEY Patented July 27, 1954

2,684,725

UNITED STATES PATENT OFFICE 2,684,725

COMPRESSIONAL WAVE GUIDE SYSTEM

Winston E. Kock, Basking Ridge, N. J., assignor to Bell Telephone Laboratories, Incorporated, New York, N. Y., a corporation of New York Application May 5, 1949, Serial No. 91,571

11 Claims. (Cl. 181—0.5)

This invention relates to sound, acoustic and other compressional wave refracting devices and particularly to an arrangement for guiding such waves along a rod or wire or the like, and for receiving such waves.

My copending application, Serial No. 52,350, filed October 1, 1948, assigned to the same assignee as the present application, discloses sound refracting devices made up of rigid elements having one or more, or in some cases all, of their dimensions, small compared with the wavelength of the compressional wave to be refracted and in certain cases spaced apart at intervals which are small compared with the wavelength.

In accordance with the present invention, rigid members such as discs or squares, are mounted at intervals along the rod, wire, or the like, along which it is desired to guide the compressional waves, the spacing and dimensions of the spaced elements being small compared to the wavelengths of the waves with which the device is intended to operate. A receiver of any conventional type may be mounted at or near one end of the wave-guiding device for receiving the guided waves and converting them into electrical waves or currents, or the guided waves may be received and utilized in any desired manner.

In the drawings,

Fig. 11 is a perspective view, partly broken away showing a receiving device embodying the invention;

Fig. 12 is a detailed fragmentary view of a suitable array of discs mounted upon a rod for use in practicing the invention;

Fig. 13 is a diagram of a measuring arrangement for measuring the directional selectivity and other transmission characteristics of a device employing the invention;

Fig. 14 is a graph of the measured relationship between relative volume level of received waves as a function of the angle of inclination between the axis of a source of directional waves and the axis of a certain receiver employing the invention; and Fig. 15 is a schematic diagram of a wave-guiding system employing the invention.

Figure 1:
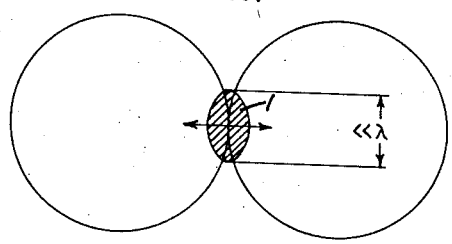
Figs. 1, 2 and 3 are diagrams useful in explaining the operation of the invention.
Figure 8:
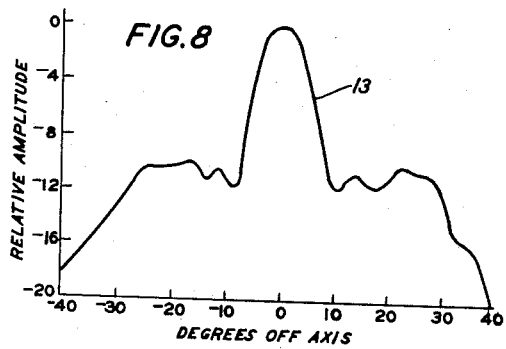
Fig. 8 is a radiation pattern obtained in the testing arrangement of Fig. 7 with a refractor of the type shown in Fig. 6.

Fig. 1 indicates a rigid disc 1 which is arranged to be moved back and forth, as shown by the arrows, in a direction parallel to its aixs. By "rigid" here is meant that a body to which the term is applied is substantially invariable in shape, size and position under the application of the forces exerted by the waves to be refracted. If the disc is oscillated at a frequency sufficiently low so that the wavelength of the sound waves in the medium at that frequency is large compared to the size of the disc, a sound pattern resembling a figure 8 will be radiated by the oscillating disc as shown. The pattern is a polar representation of the intensities of sound radiated in each direction.

Figure 2:
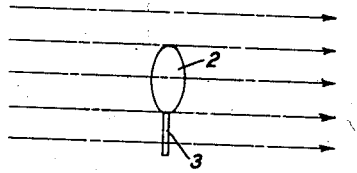
Figure 3:
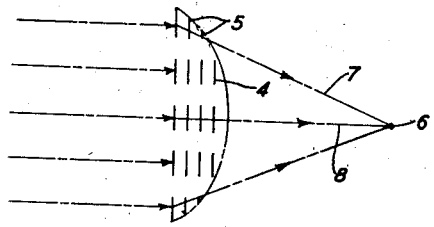
Figure 4:
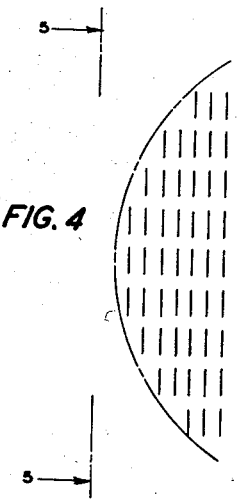
Figs. 4 and 5 are projectional views of an array of rigid elements having the form of a plano-convex sound lens.
Figure 5:
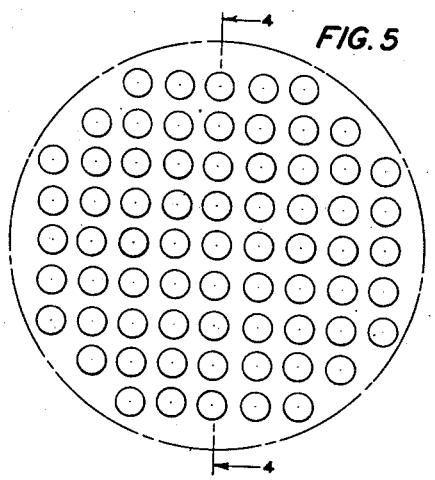
Figure 6:
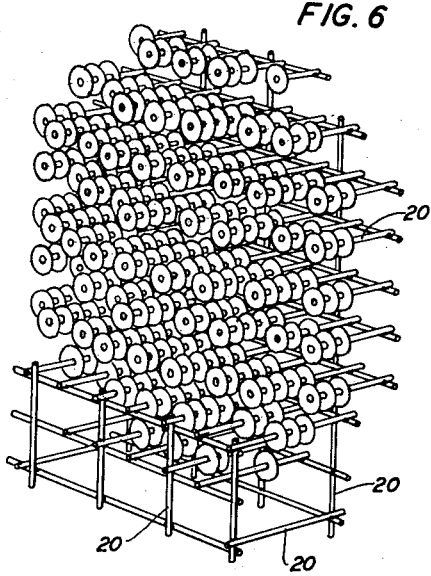
Fig. 6 is a perspective view of a sound lens of the form shown by projections in Figs. 4 and 5.

Fig. 2 shows a similar rigid disc 2 rigidly mounted upon a rod 3 and a sound wave, again of relatively low frequency, represented by arrows, is to be regarded as striking the disc. Had the disc been very light and free to move to and fro with the pulsations of the sound wave, it would not have influenced the progress of the sound wave. However, in accordance with the invention, the disc 2 is rigid and is rigidly mounted. Hence the air which normally would pass back and forth through the space bounded by the perimeter of the disc is prevented from so moving and a secondary disturbance is set up. The final sound field distribution is the sum of the original (primary) sound wave plus the secondary wave, which latter is equivalent to that radiated from the moving disc of Fig. 1. The phase of this secondary radiation lags the phase of the original wave, for the action of the stationary disc is mid-way between that of a disc which moves back and forth in synchronism with the sound wave (0-degrees lag) and that of a disc which moves back and forth an equal distance, but in opposite phase to the sound wave (180 degrees behind in phase). (See Lamb, Hydrodynamics, p. 521, 1st paragraph, Dover 1945.) The sum of two waves of the same frequency, one of which lags the other, is again a wave of the same frequency but retarded in phase. The combined sound field immediately ahead of the disc is therefore delayed in phase relative to the undisturbed field. In Fig. 3, rows of discs 4 are shown and in this case the secondary radiations from all the discs combine to produce a strongly delayed wave as it passes through the array of discs. (Figs. 4, 5 and 6 show views of similar but larger arrays of discs.) The discs in the embodiment shown in Fig. 6 are mounted upon a framework of rigid rods 20. Now a delayed wave is equivalent to a wave encountering a lower propagation velocity as the wave passes through the array. Corresponding to optical terminology, the array possesses an "index of refraction" different from that of the undisturbed medium. Thus if the array is shaped to a convex contour as shown by the contour line 5, waves at the center will be slowed down more than those passing through the thinner, outer sections and ray 8 and ray 7 will consume equal times to converge at the focal point 6 of the array. An acoustic lens is thereby produced. Best efficiency is obtained by having the plane of each disc perpendicular to the axis of the lens.

Figure 7:
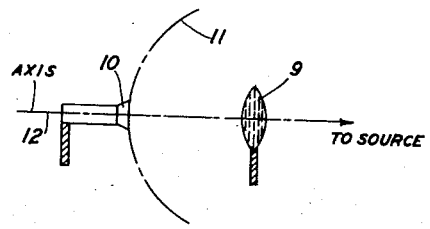
Fig. 7 is a schematic diagram of testing apparatus for obtaining radiation patterns from a sound refractive device.

Fig. 7 shows a testing system as used with an actual sound lens 9, which is illustrated as being of the type shown in perspective in Fig. 6. The sound source is off the diagram at the right, a great distance away, so that substantially plane waves arrive from it at the lens. In this case, the lens, as shown in Fig. 6, is bi-convex, that is, both front and back surfaces are convex as in many optical lenses. Lens 9 then causes the sound to converge at the mouth of a small horn 10 which is coupled to a tube at the left end of which may be placed a microphone. If the horn and lens are rotated in an arc 11 about the lens center, a varying response is obtained as plotted in Fig. 8. Here curve 13 is an experimental plot of response versus degrees off the axis 12 in Fig. 7. A beaming or focussing effect is observed where the horn and lens pass through the axis.

Figure 9:
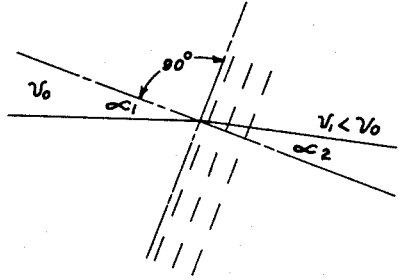
Fig. 9 is a diagram illustrating the refraction of a sound wave by apparatus constructed in accordance with the invention.

Because waves passing through the array of discs are slowed down, they will be "refracted" as in the optical case. Thus in Fig. 9, waves arriving from the left at an angle $\alpha_1$, relative to the perpendicular to the front surface of the array, will, because their velocity $v_1$ inside the array, is less than $v_0$ (their velocity outside), be bent towards the perpendicular. The bending is determined by the well-known optical relation called Snell's law, $$\frac{\sin \alpha_1}{\sin \alpha_2} = \frac{v_0}{v_1} = n \qquad (1)$$

where $\alpha_1$ and $\alpha_2$ are the angles indicated in Fig. 9 (the angle of "incidence" and the angle of "refraction" respectively as they are called in optics) and $v_0$ and $v_1$ are the velocities in the medium and in the array, respectively, and $n$ is the index of refraction. When $v_1$ is less than $v_0$, $n$ is greater than unity and the ray is bent towards the normal. When $v_1$ is greater than $v_0$ (as it can be under certain unusual circumstances to be discussed below), the ray is bent away from the normal.

Figure 10:
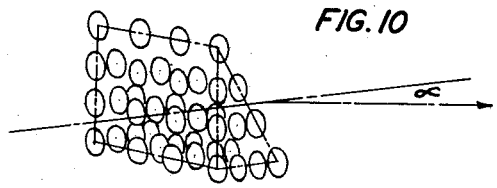
Fig. 10 is a perspective view of an array of rigid elements in the form of a sound prism.

This process of refraction permits the construction of a prism as shown in Fig. 10 and a ray entering as shown from the left will be bent on emerging at an angle $\alpha$, determined by the index of refraction of the array comprising the prism.

Lenses such as the one of Fig. 6 achieve a focussing or energy concentrating effect because of their ability to intercept the larger amount of energy falling on their area relative to the energy falling on the smaller area horn 10 in Fig. 7. Because they present their area to the incoming wave they are called "broadside" receivers or radiators.

Another type of structure useful either as a radiator or receiver for acoustic or compressional waves is one which gains its concentration of energy by its length extent. Such devices have been given the name "end-fire" radiators or receivers. The arrays of discs, which, as has been described, can be used as lenses for sound waves, can be also employed so as to provide such an end-fire radiator or receiver. A device of this kind is shown in Fig. 11. Here a microphone 31 is placed in a tube 32 having a flared end 33. Placed in the mouth of this flared end is one end of a row of rigid discs 34 mounted on a rod, wire or filament 35. Plane waves arriving toward the structure from the left impinge upon the disc studded rod at its left end and waves in the immediate vicinity of this rod are delayed because of the slower velocity of the waves traveling past such a structure. This causes the wave front, which up to this point had been a plane surface, to suffer a small depression in the vicinity of the rod. This depression indicates that the wave front at the depression is tilted toward the rod. Such a wave front tilt means that energy is being directed toward the surface of the rod. This "hole" in the wave front, due to some of the energy being concentrated towards the rod, causes energy from the remainder of the plane wave front to be directed towards this gap. More energy is thus concentrated at the rod and an amount of concentration is achieved, which depends upon the length of the rod (being greater for longer rods).

An alternative qualitative explanation of the operation of the device of Fig. 11 is as follows.

Irrespective of the angle of approach of the oncoming (primary) wave, a secondary wave is set up at each disc as above mentioned, the secondary wave propagating outward from the disc in all directions but most strongly in the direction perpendicular to the flat surfaces of the disc as indicated in Fig. 1, which direction is tangent to the wire or rod upon which the disc is supported. In the forward direction the resultant of the primary and secondary waves is directed between the directions of the primary and secondary waves and hence more nearly tangent to the wire than is the direction of the primary wave. Hence, at each disc the direction of the resultant wave is altered to conform more nearly to the tangent of the wire. Fresh hitherto undeflected parts of each primary wave strike the region of the wire at the location of each successive disc. Hence more and more of the energy of the primary wave is subjected to deflection as the wave progresses. Furthermore, each portion of a primary wave which has struck a disc is thereafter deflected by each succeeding disc. As a practical matter there is some scattering of energy due to only part of the secondary wave striking the next adjacent disc, but this effect is not controlling, and the general result is a cumulative action whereby the energy of the primary waves tends to become more and more concentrated in the direction tangent to the wire. Of course, the concentration is more pronounced along an extended straight stretch of wire than along a curved one, but there is also a pronounced effect of the waves following the wire around the curved stretches as well as along the straight stretches.

It is not necessary that the obstacles be discs or squares or even that they be flat and perpendicular to the wire. In any case the primary wave will set up a secondary wave having its center at the obstacle. The secondary wave will be propagated in all directions, though the intensity will generally be different in different directions. The secondary wave will strike the next adjacent obstacle in the forward direction along the wire and will set up a new secondary wave centered upon that obstacle, and so on, the concentration of energy propagation in the direction of the wire being continual and cumulative as in the case of the discs. Flat square obstacle members constitute an obvious alternative form which may have advantages in certain applications of the invention.

In an embodiment of the invention that has been built according to Fig. 11 and was successfully operated, the rod had a diameter of 0.093 inch, the obstacles were circular discs 0.350 inch in diameter and 0.032-inch thick, uniformly spaced on centers at intervals of 0.25 inch along the wire, these being the dimensions shown in the detail view of Fig. 12.

End-fire radiators have been treated mathematically in the case of electromagnetic waves, one reference being "Polyrod Antennas," G. E. Mueller and W. A. Tyrrell, Bell System Technical Journal, October 1947, pages 837–851. The theory indicates that the directional effect, as measured by the half power beam width of the directional lobe produced by such a radiator, is defined by the equation $$\text{Beam width} = \frac{60}{\sqrt{\rho}} \quad (2)$$

where $\rho$ is the number of free space wavelengths contained in the length of the rod. For the particular experimental array shown in Fig. 11, which is 10 inches long, $\rho$ is equal to 10.2 at 14.3 kilocycles. The measured directional pattern of this radiator at this frequency is shown in Fig. 14. The line 35 is a curve of the relative level of sound in decibels, as received from a source 10 feet distant, as the receiver is rotated through an angle $\theta$, plotted as ordinate. This curve shows the beam width to be 19 degrees, as conventionally measured between the directions for which the power in the beam is reduced to one-half its value in the direction of maximum power (3 decibels down from the maximum). The curve shows a fairly good experimental check on the theoretical value of 18.7 degrees as given by Equation 2.

An extension of this type of end-fire radiator into a longer rod is shown in Fig. 15. In this figure a sound source represented as a loudspeaker 36 is shown at the left to which has been added a long section of disc studded rod 37. The concentrating effect of the disc-on-rod structure in this case produces a wave-guiding means and the sound energy that is launched by the loudspeaker 36 onto this wave guide is mainly confined to a small cylindrical volume surrounding the rod. At the right, the rod is seen to be shaped into a curve 38 which later becomes again a straight section 39 connected to the flared tube receiver 40, like that of Fig. 7. The compressional wave energy is guided around the curved section 38 without appreciable loss and arrives at the receiver 40 with less attenuation than would have been experienced had the transmitter and receiver been mounted in the positions shown in Fig. 15 without the intervening wave guide 37—39 and dependent upon free space transmission alone. Such a wave-guiding structure may be useful in applications where closed structures such as conventional speaking tubes may be undesirable. The waves can be bound more closely to the rod if desired by closer spacing of the discs or by making them larger. This is evident from considerations of the lens structure which showed that the more elements, such as discs, per unit volume, the greater the refractive power of the acoustic refractor. The disc studded line thus acts in acoustics like the dielectric wire in electromagnetic wave propagation. The case of the dielectric wire has been analyzed for example, by Schelkunoff in his book "Electromagnetic Waves," page 425, published by Van Nostrand. In both cases, the greater the refractive index of the structure comprising the wave guide, the closer the waves are bound to the guiding structure.

It should be pointed out that the structures shown in Figs. 11 and 15 do not depend upon any vibratory motion of the discs. In fact, in all of this discussion, it has been assumed that the discs are rigid and do not vibrate under the action of the sound wave. There is no attempt to cause a wave to propagate in the metallic rod, rather the presence of the rigid immovable obstacles causes the airborne sound waves to experience a delay and thus to be concentrated in the desired manner. It will be evident also that the rod is not necessary to the operation of the device directly but only incidentally as a convenient means to support the discs or other obstacle members.

While the theories of operation advanced herein are believed to be substantially correct, the operation of the device is evidently not dependent upon any particular theory of operation and has been demonstrated in practice.

Wherever hereinabove reference is made to acoustics or acoustic waves, or to sound waves, these expressions are intended to be interpreted generically to include any phenomena involving compressional waves as distinguished from electromagnetic waves. Conversely, wherever compressional waves are mentioned in specification or in the appended claims these waves are intended to include sound waves and acoustic waves of all kinds whether audible or not and whether or not characterized as supersonic.

It is to be understood that the above-described arrangements are illustrative of the application of the principles of the invention. Numerous other arrangements may be devised by those skilled in the art without departing from the spirit and scope of the invention.

What is claimed is:

1. A compressional wave device for guiding waves along a path in a fluid medium, said device consisting solely of an array of obstacle members spaced at fixed intervals along the path and means for mounting said members in position, the obstacle members being sufficiently rigid and sufficiently rigidly mounted as substantially not to vibrate under the action of the compressional waves to be guided.

2. A device according to claim 1 in which the obstacle members are discs.

3. A device according to claim 2 in which the discs are mounted with their planes substantially perpendicular to the direction of the path at the point of mounting.

4. A device according to claim 1 in which the means for mounting is a rod.

5. A device in accordance with claim 2 in which the dimensions of the discs are small compared with the wavelength of a wave to be guided.

6. A device in accordance with claim 1 in which the obstacle members are spaced at equal intervals.

7. A device in accordance with claim 1 in which the intervals between the obstacle members are 8. A compressional wave device for guiding airborne waves along a path, said device comprising an array of obstacle members mounted at fixed intervals along the path in the absence of any enclosing structure for confining the waves, the obstacle members being sufficiently rigid and sufficiently rigidly mounted as substantially not to vibrate under the action of the compressional waves to be guided.

9. A communication system using compressional waves in a fluid medium, said system comprising a wave source, a wave guide consisting soley of an array of obstacle members mounted at fixed intervals along a path in the medium, and a translating device for fluid-borne compressional waves, the source and translating device each being coupled to the wave guide solely through the fluid medium.

10. A transmission system for compressional waves, comprising a source of compressional waves, a fluid medium for compressional waves operatively coupled to said source, and a wave guide for fluid-borne compressional waves, immersed in the fluid medium, said wave guide consisting solely of an array of obstacle members for compressional waves, the obstacle members being mounted at fixed intervals along a path in the fluid medium and being sufficiently rigid and sufficiently rigidly mounted as substantially not to vibrate under the action of the compressional waves to be guided.

11. A transmission system comprising a source of compressional waves in a fluid medium, a wave guide for fluid-borne compressional waves consisting solely of an array of obstacle members mounted at fixed intervals along a path in the medium, and a receiver for fluid-borne compressional waves, said source and said receiver being coupled to the wave guide solely by means of the fluid medium.

References Cited in the file of this patent

UNITED STATES PATENTS

| Number | Name | Date |
|---|---|---|
| 842,707 | Rose | Jan. 29, 1907 |
| 1,186,067 | Becker | June 6, 1916 |
| 1,394,428 | Kantner | Oct. 18, 1921 |
| 1,572,387 | Harrison | Feb. 9, 1926 |
| 1,666,681 | Burgess | Apr. 12, 1928 |
| 1,678,116 | Harrison | July 24, 1928 |
| 1,784,830 | Flanders | Dec. 16, 1930 |
| 1,784,871 | Harrison | Dec. 16, 1930 |
| 1,788,519 | Harrison | July 13, 1931 |
| 1,936,706 | Offel | Nov. 28, 1933 |
| 2,367,764 | Ferris | Jan. 23, 1945 |
| 2,516,056 | Keizer | July 18, 1950 |